(12) United States Patent
Melik et al.

(10) Patent No.: US 8,926,877 B2
(45) Date of Patent: Jan. 6, 2015

(54) PROCESS OF MAKING MULTICOMPONENT FIBERS

(71) Applicant: The Procter & Gamble Company, Cincinnati, OH (US)

(72) Inventors: David Harry Melik, Cincinnati, OH (US); Kelyn Anne Arora, Cincinnati, OH (US); Eric Bryan Bond, Maineville, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/710,508

(22) Filed: Dec. 11, 2012

(65) Prior Publication Data
US 2013/0099408 A1 Apr. 25, 2013

Related U.S. Application Data

(62) Division of application No. 11/044,548, filed on Jan. 27, 2005.

(60) Provisional application No. 60/539,369, filed on Jan. 27, 2004.

(51) Int. Cl.
| | | |
|---|---|---|
| *D01D 5/253* | (2006.01) | |
| *D01D 5/32* | (2006.01) | |
| *D01D 5/34* | (2006.01) | |
| *D01D 5/36* | (2006.01) | |
| *D01F 8/06* | (2006.01) | |
| *D04H 3/00* | (2012.01) | |
| *B29D 7/01* | (2006.01) | |
| *D04H 3/007* | (2012.01) | |
| *C08L 23/10* | (2006.01) | |
| *D01D 5/098* | (2006.01) | |
| *D04H 1/42* | (2012.01) | |
| *D04H 3/16* | (2006.01) | |
| *D04H 13/00* | (2006.01) | |

(52) U.S. Cl.
CPC .............. *B29D 7/01* (2013.01); *D04H 3/007* (2013.01); *C08L 23/10* (2013.01); *C08L 2205/02* (2013.01); *D01D 5/0985* (2013.01); *D01F 8/06* (2013.01); *D04H 1/42* (2013.01); *D04H 3/16* (2013.01); *D04H 13/002* (2013.01)
USPC ................ 264/103; 264/172.12; 264/172.13; 264/172.14; 264/172.15; 264/172.17; 264/172.18

(58) Field of Classification Search
USPC ............. 264/103, 172.11, 172.12, 172.13, 264/172.14, 172.15, 172.17, 172.18
See application file for complete search history.

(56) References Cited

U.S. PATENT DOCUMENTS

| | | |
|---|---|---|
| 4,960,820 A | 10/1990 | Hwo |
| 5,318,735 A | 6/1994 | Kozulla |
| 5,460,884 A | 10/1995 | Kobylivker et al. |
| 5,478,646 A | 12/1995 | Asanuma et al. |
| 5,508,318 A | 4/1996 | Comer |
| 5,539,056 A | 7/1996 | Yang et al. |
| 5,549,867 A | 8/1996 | Gessner et al. |
| 5,622,772 A | 4/1997 | Stokes et al. |
| 5,624,621 A | 4/1997 | Asanuma et al. |
| 5,629,080 A | 5/1997 | Gupta et al. |
| 5,654,088 A | 8/1997 | Gupta et al. |
| 5,667,750 A | 9/1997 | Nohr et al. |
| 5,672,415 A | 9/1997 | Sawyer et al. |
| 5,681,646 A | 10/1997 | Ofosu et al. |
| 5,733,646 A | 3/1998 | Gupta et al. |
| 5,744,548 A | 4/1998 | Nohr et al. |
| 5,804,286 A | 9/1998 | Quantrille et al. |
| 5,882,562 A | 3/1999 | Kozulla |
| 5,888,438 A | 3/1999 | Gupta et al. |
| 6,268,302 B1 | 7/2001 | Ofosu et al. |
| 6,395,392 B1 | 5/2002 | Gownder |
| 6,454,989 B1 | 9/2002 | Neely et al. |
| 6,476,135 B1 | 11/2002 | Bugada et al. |
| 6,569,945 B2 | 5/2003 | Bugada et al. |
| 6,849,324 B2 * | 2/2005 | Meece et al. ............... 428/195.1 |
| 6,878,650 B2 | 4/2005 | Clark et al. |
| 2001/0008965 A1 | 7/2001 | Kinn et al. |
| 2002/0009941 A1 | 1/2002 | Clark et al. |
| 2002/0045712 A1 | 4/2002 | Hashimoto et al. |
| 2003/0124348 A1 | 7/2003 | Arora et al. |

FOREIGN PATENT DOCUMENTS

| | | |
|---|---|---|
| EP | 0 685 579 A2 | 12/1995 |
| EP | 0 841 373 A2 | 5/1998 |
| EP | 0 894 875 A2 | 2/1999 |
| EP | 1 041 180 A1 | 10/2000 |

(Continued)

OTHER PUBLICATIONS

Geleji, et al., "Properties of Polypropylene Fibers Made from Polymer Homologue Mixtures", *Journal of Polymer Science: Polymer Symposium* 58, pp. 253-273 (1977).

(Continued)

*Primary Examiner* — Leo B Tentoni
(74) *Attorney, Agent, or Firm* — Jeffrey V Bamber; Kim W Zerby

(57) ABSTRACT

The present invention provides nonwoven webs comprising multicomponent fibers that enable the nonwoven web to possess high extensibility. The multicomponent fibers will comprise a first component comprising a polypropylene composition having a melt flow rate of from about 100 to about 2000 grams per 10 minutes and a second component comprising a polymer composition having a melt flow rate lower than the melt flow rate of the first component. The first component comprises at least about 10% of a surface of the multicomponent fiber.

18 Claims, No Drawings

(56) References Cited

FOREIGN PATENT DOCUMENTS

| EP | 1 055 703 A1 | 11/2000 |
|---|---|---|
| EP | 1 059 332 A1 | 12/2000 |
| EP | 1 223 181 A2 | 7/2002 |
| JP | A H04-073214 | 3/1992 |
| JP | 05195406 | 8/1993 |
| JP | 11323716 A2 | 11/1999 |
| WO | WO 00/28123 | 5/2000 |
| WO | WO 01/94462 | 12/2001 |

OTHER PUBLICATIONS

Mahajan, et al., "Fibers Spun from Blends of Different Molecular Weights of Polypropylene," *Journal of Applied Polymer Science*, vol. 43, pp. 49-56 (1991).

McLoughlin, et al., "Effect of Polypropylene Melt Flow Index on Spunbond Fabric Strength", *Sunoco Chemicals Research & Technology Center*, International Nonwovens Technical Conference, Sep. 5-7, 2001, 3 pages.

U.S. Appl. No. 11/044,548, filed Jan. 27, 2005, David Harry Melik et al.

U.S. Appl. No. 11/044,547, filed Jan. 27, 2005, David Harry Melik et al.

All Office Actions, U.S. Appl. No. 11/044,547, filed Jan. 27, 2005.

All Office Actions, U.S. Appl. No. 11/044,548, filed Jan. 27, 2005.

* cited by examiner

PROCESS OF MAKING MULTICOMPONENT FIBERS

CROSS-REFERENCE TO RELATED APPLICATIONS

This application claims the benefit of U.S. Provisional Application No. 60/539,369, filed Jan. 27, 2004, and is a division of U.S. patent application Ser. No. 11/044,548 filed Jan. 27, 2005 (pending).

FIELD OF THE INVENTION

The present invention relates to soft extensible nonwoven webs comprising low denier fibers and disposable articles comprising such nonwoven webs.

BACKGROUND

Nonwoven webs formed by nonwoven extrusion processes such as, for example, meltblowing and spunbonding processes may be manufactured into products and components of products so inexpensively that the products could be viewed as disposable after only one or a few uses. Representatives of such products include disposable absorbent articles, such as diaper, incontinence briefs, training pants, feminine hygiene garments, wipes, and the like.

There is an existing consumer need for nonwovens that can deliver softness and extensibility when used in disposable products. Softer nonwovens are gentler to the skin and help to provide a more garment-like aesthetic for diapers. Nonwovens that are capable of high extensibility at relatively low force can be used to provide sustained fit in products such as disposable diapers, for example, as part of a stretch composite, and facilitate the use of various mechanical post-treatments such as stretching, aperturing, etc. Extensible materials are defined herein as those capable of elongating, but not necessarily recovering all or any of the applied strain. Elastic materials, on the other hand, by definition, must recover a substantial portion of their elongation after the load is removed.

There exists within the industry today a need for extensible nonwovens with moderate to low denier fibers that can be made from conventional resins without the need for high cost specialty polymers or elastic polymers. It is well known to those trained in the art that as spinning attenuation velocities increase, molecular orientation increases and fiber elongation decreases. For strong, low denier fibers with low elongation, this is not a problem, but producing low denier fibers with high elongation remains a significant challenge. It is therefore an object of the present invention to provide nonwoven webs comprising low denier fibers that can be made from conventional resins without the need for costly additives. It is a further object of the present invention to provide disposable articles comprising such soft extensible nonwoven webs.

SUMMARY OF THE INVENTION

The present invention provides nonwoven webs comprising multicomponent fibers that enables the nonwoven web to possess high extensibility. Additionally, the present invention provides low denier fibers that possess softness and enable the formation of nonwoven webs with high extensibility.

The nonwoven web comprises multicomponent fibers. The multicomponent fibers will comprise a first component comprising a polypropylene composition having a melt flow rate of from about 100 to about 2000 grams per 10 minutes and a second component comprising a polymer composition having a melt flow rate lower than the melt flow rate of the first component. The first component comprises at least about 10% of a surface of the multicomponent fiber. Typically, the ratio of the first component to the second component is from about 10:90 to about 90:10. Preferably, the first component comprises at least about 50% of the surface of the multicomponent fiber and more preferably, the fiber is a bicomponent fiber with the first component being a sheath and the second component being a core. The polypropylene composition of the first component may comprise two or more different polypropylenes or a polypropylene and a different polymer. The second component will preferably have a melt flow rate of from about 20 to about 80 grams per 10 minutes and may be a low melt flow rate polypropylene or any thermoplastic composition. Preferably, the melt flow rate of the first component is from about 100 to about 1000 grams per 10 minutes and the second component has a melt flow rate of from about 10 to about 80 grams per 10 minutes. The nonwoven web may have a basis weight of from about 5 to about 100 gsm and may be produced by a spunbond process. The diameter of the fibers comprising the web will typically be from about 5 to about 50 microns. The nonwoven web may optionally comprise fibers other than the fibers comprising the polymer composition of the present invention. The strain at peak load of the nonwoven web is preferably greater than 80 percent in at least one direction.

The present invention is also directed to the fibers used in the nonwoven webs. The nonwoven webs of the present invention may be used to make disposable articles.

DETAILED DESCRIPTION OF THE INVENTION

As used herein, the term "absorbent article" refers to devices that absorb and contain body exudates, and, more specifically, refers to devices that are placed against or in proximity to the body of the wearer to absorb and contain the various exudates discharged from the body.

As used herein, the term "disposable" is used to describe absorbent articles that are not intended to be laundered or otherwise restored or reused as an absorbent article (i.e., they are intended to be discarded after a single use and, preferably, to be recycled, composted or otherwise disposed of in an environmentally compatible manner). A "unitary" absorbent article refers to absorbent articles that are formed of separate parts united together to form a coordinated entity so that they do not require separate manipulative parts like a separate holder and liner.

As used herein, the term "nonwoven web", refers to a web that has a structure of individual fibers or threads which are interlaid, but not in any regular, repeating manner. Nonwoven webs have been, in the past, formed by a variety of processes, such as, for example, air laying processes, meltblowing processes, spunbonding processes and carding processes, including bonded carded web processes.

As used herein, the term "microfibers" refers to small diameter fibers having an average diameter not greater than about 100 microns, and a length-to-diameter ratio of greater than about 10. Those trained in the art will appreciate that the diameter of the fibers comprising a nonwoven web impact its overall softness and comfort, and that the smaller denier fibers generally result in softer and more comfortable products than larger denier fibers. For fibers of the present invention, it is preferable that the diameters are in the range of about 5 to 50 microns to achieve suitable softness and comfort, more preferable in the range from about 5 to 35 microns in diameter, and even more preferable in the range from about 15 to 30 microns in diameter. The fiber diameter can be determined using, for example, an optical microscope calibrated with a 10 micrometer graticule.

As used herein, the term "meltblown fibers", refers to fibers formed by extruding a molten thermoplastic material through a plurality of fine, usually circular, die capillaries as molten threads or filaments into a high velocity gas (e.g., air) stream which attenuates the filaments of molten thermoplastic material to reduce their diameter to generally from 1 to 10 microns, but more typically in the range from 2 to 3 microns in diameter. Thereafter, the meltblown fibers are carried by the high velocity gas stream and are deposited on a collecting surface to form a web of randomly dispersed meltblown fibers.

As used herein, the term "spunbonded fibers" refers to small diameter fibers that are formed by extruding a molten thermoplastic material as filaments from a plurality of fine, usually circular, capillaries of a spinneret with the diameter of the extruded filaments then being rapidly reduced by drawing. A spunbond nonwoven web may be produced, for example, by the conventional spunbond process wherein molten polymer is extruded into continuous filaments which are subsequently quenched, attenuated by a high velocity fluid, and collected in random arrangement on a collecting surface. After filament collection, any thermal, chemical or mechanical bonding treatment, or any combination thereof, may be used to form a bonded web such that a coherent web structure results.

As used herein, the term "staple fibers" refers to small diameter fibers that are formed by extruding a molten thermoplastic material as filaments from a plurality of fine, usually circular, capillaries of a spinneret with the diameter of the extruded filaments then being rapidly reduced by drawing, typically using conventional godet winding systems. The fiber diameter can be further reduced through post-extrusion drawing prior to cutting the fibers into discontinuous lengths. The fibers may also have finish applied or be crimped to aid in, for example, a carding process. Staple fibers may be used, for example, to make nonwoven fabrics using carding, air-laid or wet-laid processes.

As used herein, the term "melt spinning" refers to processes that produce staple or spunbonded fibers. Additionally, hybrid processes that encompass aspects of both fall within this definition. For example, extruded filaments that are attenuated by both high velocity air near the die exit and an air drag device near the point of fiber collection.

Continuous fibers, staple fibers, hollow fibers, shaped fibers, such as multi-lobal fibers, and monocomponent and multicomponent fibers can all be produced by using the methods of the present invention. Component, as used herein, is defined as a separate part of the fiber that has a spatial relationship to another part of the fiber. Multicomponent fibers, commonly a bicomponent fiber, may be in a side-by-side, sheath-core, segmented pie, ribbon, or islands-in-the-sea configuration. The sheath may be continuous or non-continuous around the core. The fibers of the present invention may have different geometries that include round, elliptical, star shaped, rectangular, and other various eccentricities. The fibers of the present invention may also be splittable fibers. Splitting may occur by rheological differences in the polymers or splitting may occur by a mechanical means and/or by fluid induced distortion. As used herein, the diameter of a noncircular cross section fiber is the equivalent diameter of a circle having the same cross-sectional area.

As used herein, the term "extensible" refers to any nonwoven, which upon application of an extending force, has an average strain at peak load in at least one direction of at least about 80%, preferably at least about 100%, more preferably at least about 125%, and most preferably greater than about 150%. The strain at peak load described herein is determined according to the method outlined in the tensile testing methods section for nonwovens. The term elongatable may also be used to describe the extensibility of the nonwoven webs. The extension ratio is the average strain at peak load for a multicomponent nonwoven web divided by the average strain at peak load for a nonwoven web made from the lowest melt flow rate component. The nonwoven webs will be produced with the same throughput and have the same basis weight and the fibers will have the same diameter. The extension ratio is at least greater than 1, preferably greater than 1.2, and more preferably greater than 1.5. In some cases, the extension ratio will be greater than 2.

As used herein, the terms "consolidation" and "consolidated" refer to the bringing together of at least a portion of the fibers of a nonwoven web into closer proximity to form a site, or sites, which function to increase the resistance of the nonwoven to external forces, e.g., abrasion and tensile forces, as compared to the unconsolidated web. "Consolidated" can refer to an entire nonwoven web that has been processed such that at least a portion of the fibers are brought into closer proximity, such as by thermal point bonding. Such a web can be considered a "consolidated web". In another sense, a specific, discrete region of fibers that is brought into close proximity, such as an individual thermal bond site, can be described as "consolidated".

Consolidation can be achieved by methods that apply heat and/or pressure to the fibrous web, such as thermal spot (i.e., point) bonding. Thermal point bonding can be accomplished by passing the fibrous web through a pressure nip formed by two rolls, one of which is heated and contains a plurality of raised points on its surface, as is described in U.S. Pat. No. 3,855,046 issued to Hansen, et al. Consolidation methods can also include, but are not limited to, ultrasonic bonding, through-air bonding, resin bonding, and hydroentanglement. Hydroentanglement typically involves treatment of the fibrous web with high pressure water jets to consolidate the web via mechanical fiber entanglement (friction) in the region desired to be consolidated, with the sites being formed in the area of fiber entanglement. The fibers can be hydroentangled as taught in U.S. Pat. No. 4,021,284 issued to Kalwaites and U.S. Pat. No. 4,024,612 issued to Contrator et al.

As used herein, the term "polymer composition" describes a blend of two or more polymers. The polymer composition generally includes, but is not limited to, homopolymers, copolymers, such as, for example, block, graft, random and alternating copolymers, terpolymers, etc., and blends and modifications thereof. The polymer composition shall include all possible geometrical configurations of the material. These configurations include, but are not limited to, isotactic, syndiotactic and random symmetries.

Examples of suitable thermoplastic polymers for use in the present invention include, but are not limited to polyethylene, polypropylene, polyethylene-polypropylene copolymers, polyesters, polyhydroxyalkanoates, aliphatic ester polycondensates, and mixtures thereof. Other suitable thermoplastic polymers include biodegradable polymers such as PHAs, PLAs, starch compositions and other biodegradable polymers described in U.S. Publication 2002/0188041-A1. Other suitable polymer compositions are described in U.S. Pat. No. 6,476,135 in the description of an olefin polymer composition. Polymers comprise polyolefins such as polyethylene and polypropylene, polyamides, and aliphatic containing polyesters such as poly(butylene succinate) and poly(butylene succinate adipate). Additional aliphatic containing polyesters include, but are not limited to, poly(caprolactone), poly(ethylene succinate), poly(ethylene succinate adipate), aliphatic polyester-based polyurethanes, copolyesters of adipic acid, terephthalic acid, and 1,4-butanediol, polyesteramides, combinations and copolymers thereof, and the like. Other suitable polymers include a low density or ultra low density (p<0.9 g/cc) polyethylene resin and an ethylene-propylene elastomer-containing resin.

As used herein, the term "polypropylene composition" is utilized in its ordinary commercial meaning to include any polymer composition which includes polypropylene. Additionally, as used herein, the term "polypropylene composition" generally includes, but is not limited to, homopolymers of propylene, copolymers of propylene, such as, for example, block, graft, random and alternating copolymers, terpolymers, etc., and blends and modifications thereof. Furthermore, unless otherwise specifically limited, the term "polypropylene composition" shall include all possible geometrical configurations of the material. These configurations include, but are not limited to, isotactic, syndiotactic and random symmetries. Examples of suitable polypropylenes for use in the present invention include, but are not limited to, isotactic and syndiotactic polypropylene homopolymers, and copolymers of propylene with ethylene and/or butene. The polypropylene composition may be a composition where two different polypropylene materials, such as a higher melt flow rate polypropylene and a lower melt flow rate polypropylene, are blended. Those trained in the art will appreciate that the incorporation of comonomers such as ethylene or butene or changes in stereoregularity will generally lead to a reduction in the melting temperature of the polypropylene composition. If the melting temperature becomes too low, the properties of the resulting fibers may be unsuitable for use in some products of the present invention. For example, for materials stored in a warehouse in summer, where temperatures can reach above 80° C., the dimensional stability of the product can be compromised if the melt temperature is below about 80° C. For use in the present invention, it is preferred that the melting temperature of the polypropylene composition is greater than about 100° C., more preferably greater than approximately 120° C., and even more preferably greater than about 140° C. The melting temperature as described herein is determined by DSC and is taken as the highest endothermic peak temperature observed on the DSC heating scan using the method outlined in ASTM D 3418, incorporated herein by reference.

The polymer and polypropylene of the present invention may optionally include an additional ingredient. Suitable additional ingredients include, but are not limited to, those which are typically used in fiber making, nonwoven processing, polymer composition and polymer formation. In the case of the polymeric blend, desirable additional ingredients are those which form a solid solution and/or homogeneous mixture, with the polymeric blend and other components of the polymeric composition.

In one aspect, the additional ingredient is selected from the group such as: nucleating agents, antiblock agents, antistatic agents, a different polymer, pro-heat stabilizers, softening agents, lubricants, surfactants, wetting agents, plasticizers, light stabilizers, weathering stabilizers, weld strength improvers, slip agents, dyes, antioxidants, flame retardants, pro-oxidant additives, natural oils, synthetic oils, anti-blocking agents, fillers, coefficient of friction modifiers, humectants, and combinations thereof. Additionally, any coatings or surface treatments for the fibers may be added during processing or after the fiber is formed.

In the polymeric or polypropylene composition, the additional ingredient will comprise an amount effective to achieve the result the additional ingredient is present in the polymeric mixture to achieve. For example, a stabilizing amount for a UV stabilizer, a lubricating amount for a lubricating agent. For a skin conditioning agent, an amount of an agent that has an effect on the skin would be desired. Typically, the additional ingredient is from about 0.1% to about 5% of the composition. These additional ingredients may be employed in conventional amounts although, typically, such ingredients are not required in the composition in order to obtain the advantageous combination of softness and extensibility.

The first polypropylene component will comprise a high melt flow rate polypropylene. The first polypropylene component may also comprise a low melt flow rate polypropylene. The high melt flow rate polypropylene will have a melt flow rate in the range from about 100 to about 1000 grams per 10 minutes, preferably from about 100 to about 800 grams per 10 minutes, and more preferably from about 100 to about 600 grams per 10 minutes. The low melt flow rate polypropylene will have a melt flow rate of from about 10 to about 80 grams per 10 minutes and preferably from about 15 to about 70 grams per 10 minutes. The first polypropylene component blend will have a melt flow rate in the range from about 100 to about 2000 grams per 10 minutes. Preferably, the melt flow rate of the first polypropylene component blend will be from about 100 to about 1000 grams per 10 minutes, and more preferably from about 100 to about 600 grams per 10 minutes. The melt flow rate as described herein is determined according to the method outlined in ASTM D 1238 (condition L; 230/2.16), incorporated herein by reference.

Those trained in the art will recognize that the first polypropylene component with the above described range of melt flow rates are typically used in a melt-blowing process. It has been unexpectedly found, however, that such resins in combination with a lower melt flow rate second component can also be used in melt-spinning processes to make, for example, spunbond fibers. It has further been unexpectedly found that the resultant webs have higher elongation than webs made using typical polypropylene spunbond grade resins at the same low fiber diameters, where the melt flow rate of polypropylene spunbond resins generally ranges from about 25 to 60 grams per 10 minutes.

While not intending to be bound by theory, it is believed that the combination of a high melt flow rate polymer and a low melt flow rate polymer is desired as the low melt flow rate polymer component improves the bonding and strength of the nonwoven web while the high melt flow rate polymer component improves the extensibility.

Typically, the fibers of the present invention are low denier which help to produce extremely soft, extensible and highly uniform nonwoven webs. Nonwoven webs with this combination of properties are particularly well suited for use in disposable absorbent articles such as diapers, incontinence briefs, adult incontinence, light incontinence products, training pants, feminine hygiene garments, wipes, and the like, as they are able to be used in portions of the article where extensibility and softness can aid in the article's comfort and overall performance. Suitable applications for the nonwoven webs of the present invention include topsheet for feminine hygiene pads, diapers, and/or adult incontinence products, stretchable components for diapers such as ears or tabs, and cleansing wipes for hard surfaces such as floors or counters or for the skin such as facial cleansing, body cleansing, or baby wipes.

Although the nonwoven web of the present invention can find beneficial use as a component of a disposable absorbent article, such as a diaper, its use is not limited to disposable absorbent articles. The nonwoven web of the present invention can be used in any application requiring or benefiting from softness and extensibility, such as wipes, polishing cloths, floor cleaning wipes, furniture linings, durable garments, and the like. Many different wipes, such as facial cleansing cloths, body and personal cleansing cloths and/or hand mitts, and other beauty or personal cleansing applications may be desired.

If additional extensibility or activation of the nonowoven web is desired, a post processing treatment may be desired. Both mechanical and chemical post processing treatments may be suitable. Possible mechanical post processing treatments include stretching, tentoring, and other treatments found in US Pat. Pub. 2004/0131,820 and 2003/028,165, WO 04/059,061, WO 04/058,214, and U.S. Pat. Nos. 5,518,801 and 5,650,214. Nonwovens that are capable of high extensibility, such as the nonwovens of the present invention, facilitate the use of mechanical post-treatments.

The extensible, soft nonwoven of the present invention may also be in the form of a laminate. Laminates may be combined by any number of bonding methods known to those skilled in the art including, but not limited to, thermal bonding, adhesive bonding including, but not limited to spray adhesives, hot melt adhesives, latex based adhesives and the like, sonic and ultrasonic bonding, and extrusion laminating whereby a polymer is cast directly onto another nonwoven, and while still in a partially molten state, bonds to one side of the nonwoven, or by depositing melt blown fiber nonwoven directly onto a nonwoven. These and other suitable methods for making laminates are described in U.S. Pat. No. 6,013, 151, Wu et al., and U.S. Pat. No. 5,932,497, Morman et al. One use of the nonwoven web is a spunbond layer in a spunbond-meltblown-spunbond (SMS) laminate. Alternatively, the nonwoven web could also be used as a meltblown layer.

The products and methods of the present invention are further exemplified in the following examples.

Experimental Procedures

Fiber Analysis

Mounting of Fiber Samples:

For each sample tested, 10-12 fibers were prepared. Fibers are randomly selected and separated from the bundle. The fiber is then taped to a rectangular paper frame, being sure to wrap tape and the end of the fiber over the backside the frame. Care is taken not to stretch or deform the fiber in any way.

Diameter Measurements:

Mounted fibers are viewed on a Zeiss Axioskope microscope equipped with a color video camera and a display monitor. With the fiber in focus under a 40× objective lens and a 1× eyepiece the diameter of the fiber is measured on the monitor in inches with a pair of calipers. The microscope is calibrated for this magnification, using a 1 mm scale divided into 100ths, manufactured by Graticules LTD.

Tensile Testing:

Mounted samples are tensile tested on an MTS Synergie 400 material tester equipped with a calibrated 10 Newton load cell and Testworks 4 software version 4.04. Fibers are tested according to ASTM D3822, with a test gauge length of 1 inch and a crosshead speed of 2 inches per minute. Mounted fibers are loaded into tester grips. The paper frame is cut away on both sides of the fiber so paper does not interfere with test. An average of ten fibers are tested, and the average strain at break is used as the measure of extensibility.

Nonwoven Handsheet Production and Tensile Testing

Nonwoven Handsheet Production:

Polyolefin compositions are converted into nonwoven handsheet samples using the following procedure:

Neat or compounded materials are first melt spun into fibers (monocomponent or bicomponent) using a two extruder system, where each extruder is a horizontal single-screw extruder. The extrudate rate from each extruder to the spinpack is controlled by a metering melt pump that feeds a 4-hole spin pack (Hills Incorporated, W. Melbourne, Fla.). In all examples the spinpack is fitted with a spinneret for a round hole, and distribution plates for a sheath-core cross-section. For the case of monocomponent fibers, the same resin is used in both extruders for a sheath:core ratio of approximately 50:50. The extruder/melt pump/spinpack system is mounted on an adjustable height platform. The spin line length is maintained constant at a distance of approximately 70 inches, the mass throughput at about 0.4 grams per minute per hole, and the melt extrusion temperature at approximately 230° C. The molten filaments exit the spinneret into a quench cabinet that is located directly below the spinpack and are drawn down with a height adjustable air drag device that uses compressed air at high pressures to produce a stream of air that surrounds and draws the filaments. The air pressure is adjusted to achieve collected fiber diameters of about 20-25 microns.

The fibers are collected on a stationary perforated metal screen (0.25 inch holes, 0.45 inch center-to-center spacing), where the fiber collection pattern is effectively circular with the inner 5 inches or so being suitably uniform for tensile testing and where a sufficient time of collection is used to achieve an average basis weight of about 30-45 grams per square meter within the inner region. The collected fiber sample is then bonded ultrasonically to make a nonwoven handsheet, where the ultrasonic bonding of nonwovens is described by Mao and Goswami in International Nonwovens Journal, Vol. 10, No. 2, pages 38-47, and No. 3, pages 17-28. An ultrasonic bonding system manufactured by Machintek Corporation (Fairfield, Ohio) is used for bonding. This system incorporates a Branson Ultrasonics Corporation (Danbury, Conn.) model 921AE actuator equipped with a model 109-121-392 rectangular slotted horn, and a translation stage to allow for a constant bonding time across the fiber sample. Using a bonding plate having a bond area of about 20% and bonding points approximately 1.2 millimeters long×0.7 millimeters wide arranged in a staggered row configuration, good bonding is found for an actuator amplitude setting of 50%, a horn pressure of about 40 pounds per square inch, and a translational speed of approximately 4 meters per minute. Prior to bonding, a 0.010 inch thick sheet of fiber-reinforced Teflon is placed between the fiber sample and the horn.

Tensile Testing for Nonwoven Handsheets:

For each nonwoven handsheet, one tensile test strip is prepared by first cutting a 1 inch width strip through the center of the handsheet using a JDC Precision Sample Cutter (Thwing-Albert Instrument Company, Philadelphia, Pa.), whereby the direction of this cut is parallel to the short dimension of the bonding points. The length of the sample strip is then trimmed to about 4 inches, making sure that the center of the sample strip is nearly the center of the handsheet.

Each sample strip is tensile tested on a testing machine, for example, on an Instron 1122 modified with a MTS Sintech ReNew Upgrade Package and equipped with a 50 pound load cell, 1 inch width serrated grip faces, and Testworks Software Version 3.1, or on a MTS Synergie 400 test stand equipped with a 100 newton load cell, 1 inch width rubber grip faces, and Testworks Software Version 4.07 (Instron Corporation, Canton, Mass.; MTS Systems Corporation, Eden Praire, Minn.). Sample strips are tested with a gauge length of 2 inches and a crosshead speed of 2 inches per minute. An average of five nonwoven strips is tested, and the average strain at peak load is used as the measure of extensibility. For the examples, the extension ratio is the average strain at peak load for the bicomponent handsheet or nonwoven divided by the average strain at peak load for the handsheet or nonwoven made from the core component.

Spunbond Nonwoven Web Production and Tensile Testing
Spunbond Nonwoven Web Production:

Polyolefin compositions are converted into spunbond nonwoven webs on a pilot scale spunbond nonwoven line equipped with a slot jet attenuation system and thermal calendar bonding system. Webs are produced using a mass throughput of 0.3 grams per minute per hole, and the line speed is adjusted to achieve a basis weight of approximately 25 grams per square meter.

Tensile Testing for Spunbond Nonwoven Webs:

For each nonwoven web, one tensile test strip is prepared by first cutting a 1 inch width strip in the direction of interest using a JDC Precision Sample Cutter (Thwing-Albert Instrument Company, Philadelphia, Pa.). The length of the sample strip is then trimmed to about 7 inches.

Each sample strip is tensile tested on a testing machine, for example, on an Instron 1122 modified with a MTS Sintech ReNew Upgrade Package and equipped with a 50 pound load cell, 1 inch width serrated grip faces, and Testworks Software Version 3.1, or on a MTS Synergie 400 test stand equipped with a 100 newton load cell, 1 inch width rubber grip faces, and Testworks Software Version 4.07 (Instron Corporation, Canton, Mass.; MTS Systems Corporation, Eden Praire, Minn.). Sample strips are tested with a gauge length of 5 inches and a crosshead speed of 5 inches per minute. An average of ten nonwoven strips is tested, and the average strain at peak load is used as the measure of extensibility. For the examples, the extension ratio is the average strain at peak load for the bicomponent fiber nonwoven web divided by the average strain at peak load for the nonwoven web made from the core component.

Comparative Example 1

This comparative example illustrates the properties resulting from melt spinning a conventional spunbond grade polypropylene. Specifically, a polypropylene resin with a melt flow rate of 35 grams per 10 minutes (ProFax PH835 from Basell Polyolefins Company, Wilmington, Del.) is spun and bonded into nonwoven handsheets. Table 1 shows the average strain at peak load for these handsheets.

Comparative Example 2

This comparative example illustrates the properties resulting from melt spinning a high melt flow rate polypropylene. Specifically, a polypropylene resin with a melt flow rate of 400 grams per 10 minutes (Valtec HH441 from Basell Polyolefins Company, Wilmington, Del.) is spun and bonded into nonwoven handsheets. Table 1 shows the average strain at peak load for these handsheets.

Example 1

This example illustrates synergistic properties resulting from melt spinning sheath/core bicomponent fibers having a conventional spunbond grade polypropylene core and a high melt flow rate polypropyene sheath. Specifically, 20:80, 40:60, 60:40, 80:20 and 90:10 sheath:core ratios by weight of the conventional spunbond grade polypropylene from Comparative Example 1 in the core and the high melt flow rate polypropylene from Comparative Example 2 in the sheath are spun and bonded into nonwoven handsheets. Table 1 shows the average strain at peak load for the handsheets made from the sheath/core fibers are higher than either of the individual constituents, indicating synergistic elongation behavior.

TABLE 1

Handsheets Made From Bicomponent Fibers-High MFR Polypropylene Sheath/Conventional MFR Polypropylene Core

| EXAMPLE # | SHEATH:CORE | STRAIN AT PEAK LOAD (%) | EXTENSION RATIO |
| --- | --- | --- | --- |
| C1 | 0:100 (100% Profax PH835) | 72 | — |
| 1 | 20:80 | 113 | 1.6 |
| 1 | 40:60 | 128 | 1.8 |
| 1 | 60:40 | 153 | 2.1 |
| 1 | 80:20 | 121 | 1.7 |
| 1 | 90:10 | 129 | 1.8 |
| C2 | 100:0 (100% Valtec HH441) | 98 | — |

Example 2

This example illustrates the properties resulting from melt spinning sheath/core bicomponent fibers having a conventional spunbond grade polypropylene core and a high melt flow rate polyolefin blend sheath. Specifically, 20:80, 40:60, 60:40, 80:20 and 90:10 sheath:core ratios by weight of the conventional spunbond grade polypropylene from Comparative Example 1 in the core and in the sheath an 80:20 blend by weight of the polypropylene from Comparative Example 2 and a soft polyolefin resin with a melt flow rate of 25 grams per 10 minutes (Adflex Z104S from Basell Polyolefins Company, Wilmington, Del.) are spun and bonded into nonwoven handsheets. The sheath blend is pre-compounded in a twin-screw extruder prior to spinning Table 2 shows the average strain at peak load for these handsheets.

TABLE 2

Handsheets Made From Bicomponent Fibers-High MFR Polyolefin Blend Sheath/Conventional MFR Polypropylene Core

| EXAMPLE # | SHEATH:CORE | STRAIN AT PEAK LOAD (%) | EXTENSION RATIO |
| --- | --- | --- | --- |
| C1 | 0:100 (100% Profax PH835) | 72 | — |
| 2 | 20:80 | 133 | 1.8 |
| 2 | 40:60 | 151 | 2.1 |
| 2 | 60:40 | 158 | 2.2 |
| 2 | 80:20 | 162 | 2.3 |
| 2 | 90:10 | 150 | 2.1 |

Comparative Example 3

These comparative examples illustrate the single fiber properties resulting from melt spinning fibers from a conventional spunbond grade polypropylene. Specifically, a polypropylene resin with a melt flow rate of 35 grams per 10 minutes (ProFax PH835 from Basell Polyolefins Company, Wilmington, Del.) is spun at a mass throughput of 0.3 grams per hole per minute on a pilot-scale spunbond nonwoven line.

Unbonded fiber bundles are collected for single fiber property evaluation. Table 3 shows the resultant diameters and tensile properties of the fibers.

Example 3

This example illustrates the single fiber properties resulting from melt spinning sheath/core bicomponent fibers having a conventional spunbond grade polypropylene core and a high melt flow rate polyolefin blend sheath. Melt-spun fibers are prepared at a mass throughput of 0.3 grams per hole per minute on a pilot-scale spunbond nonwoven line. The ratio of sheath to core is 60:40 by weight. The conventional spunbond grade polypropylene from Comparative Example 3 is used as the core material. The sheath is 100% Valtec HH441 (400 MFR polypropylene resin available from Basell. Unbonded fiber bundles are collected for single fiber property evaluation. Table 3 shows the resultant diameter and tensile properties of the fibers. At similar diameters, fibers of the present invention exhibit higher elongation than fibers prepared from the 35 MFR polypropylene resin alone.

TABLE 3

Bicomponent Single Fiber Data-High MFR Polypropylene Sheath/ Conventional MFR Polypropylene Core

| Example # | Formulation | Diameter (microns) | Strain at Break (%) |
|---|---|---|---|
| C3 | PP Control | 19 | 294 |
| C3 | PP Control | 23 | 303 |
| 3 | Bico | 21 | 408 |

Comparative Example 4

Thermally bonded spunbond nonwoven webs are prepared using the formulations and mass throughputs as described in Comparative Example C3. The data reported is at the optimum bonding temperature as defined by the condition producing the highest elongation at peak in the cross direction. Basis weights, fiber diameters and resultant fabric properties are listed in Table 4.

Example 4

Thermally bonded spunbond nonwoven webs are prepared using the formulations and mass throughputs as described in Example 3. The data reported is at the optimum bonding temperature as defined by the condition producing the highest elongation at peak in the cross direction. Basis weights, fiber diameters and resultant fabric properties are listed in Table 4. The nonwoven fabric prepared from the fibers of the present invention (4) exhibits higher elongation than the standard polypropylene control (C4).

TABLE 4

Spunbond Nonwoven Webs from Bicomponent Fibers-High MFR Polypropylene Sheath/Conventional MFR Polypropylene Core

| Example # | Formulation | Basis Weight (g/m²) | Fiber Diameter (microns) | Standard Tensile Strain at Peak Load (%) | Extension Ratio |
|---|---|---|---|---|---|
| C4 | PP | 26 | 23 | 87 | — |
| 4 | Bico | 25 | 21 | 138 | 1.6 |

The disclosures of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the present invention have been illustrated and described, it would be obvious to those skilled in the art that various other changes and modifications can be made without departing from the spirit and scope of the invention. It is intended to cover in the appended claims all such changes and modifications that are within the scope of the invention.

What is claimed is:

1. A method of making multi-component fibers having an outside surface, said method comprising the steps of:
    a. providing a first component comprising a polypropylene having a single melt flow rate in the range of from about 100 to about 2,000 grams per 10 minutes;
    b. providing a second component comprising a polymer having a single melt flow rate in the range of from about 10 to about 80 grams per 10 minutes;
    c. directing separate feed streams of each component into a spinneret configured to form a spatial configuration of the components, and melt spinning said first component and said second component into multi-component fibers which have a diameter of from about 5 to about 50 microns, wherein:
        the first component comprises at least about 50% of the outside surface of the multi-component fibers, and said first component consists essentially of a single melt flow rate in the range of from about 100 to about 2,000 grams per 10 minutes, and
        the second component of the fibers is spatially separate from said first component, and said second component consists essentially of a single melt flow rate in the range of from about 10 to about 80 grams per 10 minutes.

2. The method of claim 1 wherein the first component is a sheath and the second component is a core.

3. The method according to claim 2 wherein the ratio of the first component to the second component is from about 10:90 to about 90:10 by weight.

4. The method according to claim 2 wherein the ratio of the first component to the second component is from about 20:80 to about 80:20 by weight.

5. The method of claim 1 wherein the first component and the second component of the fibers are in a side-by-side configuration.

6. The method of claim 1 wherein the first component and the second component of the fibers are in a segmented pie configuration.

7. The method of claim 1 wherein the fibers have a non-circular cross-section.

8. The method of claim 1 wherein the first component and the second component of the fibers are in an islands-in-the-sea configuration.

9. The method of claim 8 wherein the first component forms the sea and the second component of the fibers forms at least one island.

10. The method of claim 1 wherein the first component has a single melt flow rate in the range from about 100 to about 1,000 grams per 10 minutes.

11. The method of claim 1 wherein the first component comprises a polypropylene composition containing at least two different polypropylenes.

12. The method of claim 1 wherein the first component comprises a polypropylene composition containing a polypropylene and a polymer.

13. The method of claim 1 wherein the second component comprises a polymer selected from the group consisting of polypropylene, polyethylene-polypropylene mixtures, polyethylene-polypropylene copolymers, polyesters, polyhydroxyalkanoates, aliphatic ester polycondensates, starch compositions, polyamides, poly(caprolactone), poly(ethylene succinate), poly(ethylene succinate adipate), aliphatic polyester-based polyurethanes, copolyesters of adipic acid, terephthalic acid, 1,4-butanediol, polyester-amides, polylactic acid and mixtures thereof.

14. The method of claim 1 further comprising a step of forming said multi-component fibers into a spunbonded nonwoven web.

15. The method of claim 14 wherein the nonwoven web has an extensibility of at least 80%.

16. The method of claim 14 wherein the nonwoven web has a basis weight of from about 5 to about 100 grams per square meter.

17. The method of claim 14 wherein the nonwoven web has a strain at peak load in at least one direction of greater than about 100 percent.

18. The method of claim 14 wherein the nonwoven web has an extension ratio of greater than about 1.

\* \* \* \* \*